US012217586B1

(12) United States Patent
Illouz

(10) Patent No.: US 12,217,586 B1
(45) Date of Patent: Feb. 4, 2025

(54) APPARATUS FOR ENABLING INSTALLATION OF RECESSED CEILING COMPONENTS

(71) Applicant: Seeless Solutions, Inc, Los Angeles, CA (US)

(72) Inventor: Shalom Illouz, Los Angeles, CA (US)

( * ) Notice: Subject to any disclaimer, the term of this patent is extended or adjusted under 35 U.S.C. 154(b) by 0 days.

(21) Appl. No.: 18/501,818

(22) Filed: Nov. 3, 2023

(51) Int. Cl.
*G08B 17/10* (2006.01)
*E04B 9/00* (2006.01)

(52) U.S. Cl.
CPC .............. *G08B 17/10* (2013.01); *E04B 9/006* (2013.01)

(58) Field of Classification Search
CPC .. E04B 9/006; F21K 9/232; F21S 8/02; F21S 8/026; F21V 15/01; F21V 23/0478; G01D 11/245; G08B 17/00; G08B 17/06; G08B 17/10; G08B 17/107; G08B 17/113; G08B 19/00
USPC .......................................................... 340/628
See application file for complete search history.

(56) References Cited

U.S. PATENT DOCUMENTS

| | | | | |
|---|---|---|---|---|
| 4,529,976 | A * | 7/1985 | Jameson | G08B 17/10 340/693.8 |
| 5,019,805 | A * | 5/1991 | Curl | G08B 7/06 340/331 |
| 5,315,292 | A * | 5/1994 | Prior | A62C 37/38 169/61 |
| 5,333,418 | A * | 8/1994 | Chambers | G08B 17/113 52/27 |
| 2005/0035868 | A1* | 2/2005 | Back | G08B 17/10 340/627 |
| 2005/0057367 | A1* | 3/2005 | Regh | G08B 17/10 340/693.6 |
| 2008/0210839 | A1* | 9/2008 | Klapp | G08B 17/113 248/343 |
| 2010/0206048 | A1* | 8/2010 | Locke | B66B 11/024 73/31.03 |
| 2015/0097678 | A1* | 4/2015 | Sloo | G08B 17/10 340/602 |
| 2018/0238571 | A1* | 8/2018 | Joseph | F24F 11/33 |
| 2022/0268402 | A1* | 8/2022 | Mateer | A47G 1/1633 |

* cited by examiner

*Primary Examiner* — Stephen R Burgdorf
(74) *Attorney, Agent, or Firm* — Cotman Ip Lawgroup

(57) ABSTRACT

One or more embodiments of the invention introduces a novel recessed mounting system for ceiling components such as smoke detectors, improving their installation, aesthetic integration, and functionality. By recessing all electronics into the ceiling, the system achieves a streamlined appearance, leaving only the sensing element exposed. The system comprises three major components: the recessed housing, the sensor module, and the finish trim. The recessed housing seamlessly integrates with remodel and new construction projects, providing an unobtrusive look. The sensor module supports various sensor types, ensuring adaptability to different detection needs. The finish trim offers customization options, enabling field changes from round to square shapes and providing a selection of custom finishes to match architectural elements. This innovative system enhances the aesthetic appeal, smoke detection capabilities, and ease of installation of smoke detectors in residential, commercial settings.

9 Claims, 4 Drawing Sheets

APPARATUS FOR ENABLING INSTALLATION OF RECESSED CEILING COMPONENTS

CROSS REFERENCES TO RELATED APPLICATIONS

This application claims the benefit of U.S. Non-Provisional patent application Ser. No. 18/466,654 filed on Sep. 13, 2023, entitled “APPARATUS FOR ENABLING INSTALLATION OF RECESSED CEILING COMPONENTS”, which is incorporated herein by reference in its entirety.

BACKGROUND

Existing platforms for mounting ceiling components such as smoke detectors, wireless access points, or other ceiling mounted devices permit such components to protrude from the ceiling. This tends to result in an aesthetically unattractive design because the components do not seamlessly blend with the ceiling and are therefore highly visible. Existing smoke detectors, for example, place all the electronic components of the smoke detector in a device that sits below the ceiling itself and is attached thereto. Attempts to improve upon the design of such ceiling components, such as the Nest™ smoke detector, have sought to add a better design aesthetic to the device but such devices are still left protruding from the ceiling albeit they are in a more attractive plastic casing. A limitation in making changes to celling mounted components is that it is difficult to do so without inhibiting the function of the device itself. To overcome these problems and other problems inherent in the prior art, there is a need for a mounting system and apparatus that can hide ceiling components from view while maintaining and/or improving their intended functionality.

SUMMARY OF INVENTION

One or more embodiments of the invention are directed to an apparatus for enabling the installation of recessed ceiling components. The mounting system recesses the electronic elements of the ceiling component into the ceiling while leaving only the sensing element exposed for optimal functionality.

The recessed mounting system configured in accordance with one or more embodiments of the invention comprises three core components: a recessed housing component, a sensor module, and finish trim. The recessed housing seamlessly integrates into a recessed housing remodel can or a customized housing useful for new construction implementations or remodels in a way that ensures a low profile or flush appearance. The sensor module supports various sensor types, accommodating different detection needs based on the type of ceiling component being implemented. The finish trim allows for field changes from round to square shapes and offers a range of custom finishes to match architectural design preferences.

In one or more embodiments of the invention an apparatus for recessing ceiling components into ceiling drywall is described. The apparatus utilizes a recessed housing component containing a sensor module. The recessed housing is configured for installation into ceiling drywall so that a portion of the electronic components are above the ceiling drywall yet and open end extends through the ceiling or below the ceiling. The sensor module within the recessed housing has sensor electronics coupled with at least one sensor configured to determine if there is smoke within a smoke chamber or other detectable elements in the air and upon detection of such elements causes a sound emitting element to initiate an audible sound. At least one sensor within the sensor module contains a smoke chamber. The sensor enclosure is configured to extend out of the recessed housing through the ceiling or flush with the ceiling into a finish trim. The finish trim couples with the recessed housing to cover the sensor module from view. The finish trim may extend slightly below said ceiling or be placed flush with the ceiling depending upon the amount the recessed housing is positioned below the ceiling itself.

DETAILED DESCRIPTION OF THE INVENTION

Figure 1:
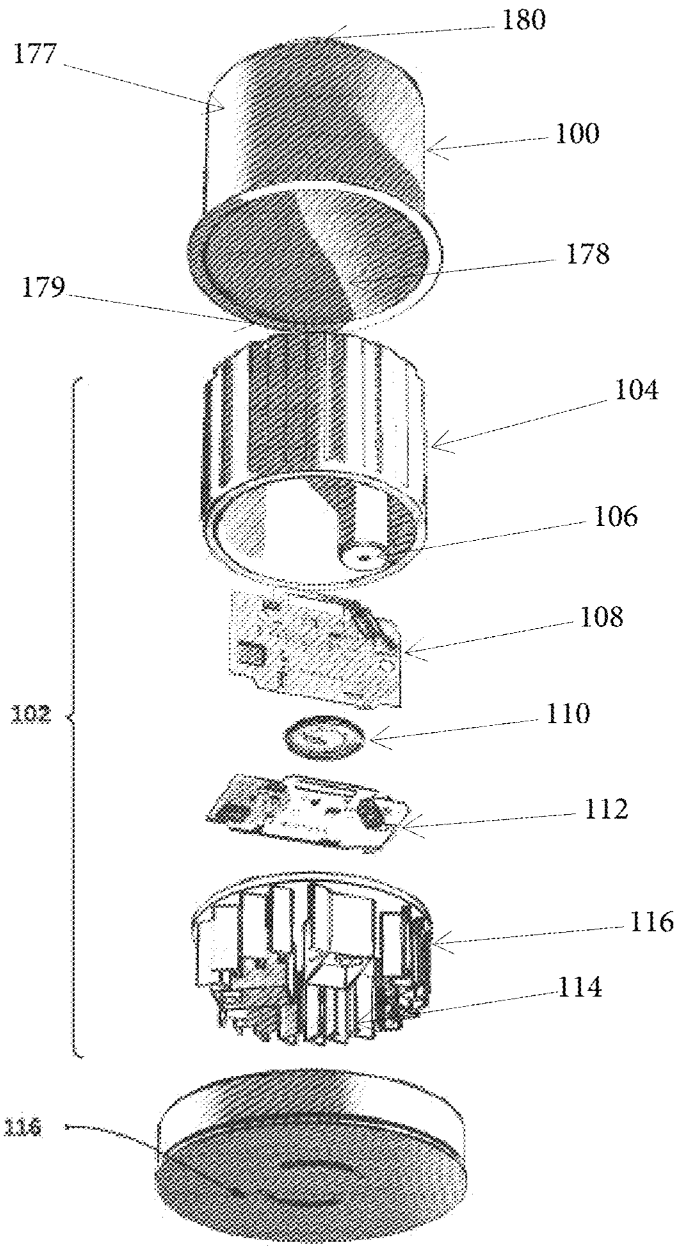
FIG. 1 illustrates an exploded view of recessed mounting system and apparatus for ceiling mounted components as it is configured in accordance with one or more embodiments of the invention.

A recessed mounting system and apparatus for ceiling mounted components will now be described through examples setting forth one or more embodiments of the invention. In the following exemplary description numerous specific details are set forth to provide a more thorough understanding of embodiments of the invention. It will be apparent, however, to an artisan of ordinary skill that the present invention may be practiced without incorporating all aspects of the specific details described herein. The reader should note that in some cases specific features, quantities, or measurements well known to those of ordinary skill in the art have not been described in detail so as not to obscure the invention. It should also be noted that although examples of the invention are set forth herein, the claims, and the full scope of any equivalents, are what define the true scope of the invention. Any terms that are to be construed in these claims should be given their broadest reasonable construction without rendering the terms into something covered by prior art devices.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term “first”, “second” and the like, herein do not denote any order, quantity or importance, but rather are used to distinguish one element from another, and the terms “a” and “an” herein do not denote a limitation of quantity, but rather denote the presence of at least one of the referenced items.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 illustrates an exploded view of recessed mounting system and apparatus for ceiling mounted components as it is configured in accordance with one or more embodiments of the invention. In the example depicted, a smoke detector serves as the ceiling mounted component. In this smoke detector embodiment, the apparatus comprises a recessed housing (100), a sensor module (102) having a module enclosure (104), a battery backup component (106), a high voltage printed circuit board ("PCB") (108), a sound emitting element (110) such as a horn, a low voltage PCB (112), and a sensor element (114), and finish trim (116) that connects to the sensor module (102).

The recessed housing (100) may take various forms that serve as a location within which to place the sensor module components thereby ensuring a clean and unobtrusive appearance. In one or more embodiments of the invention the recessed housing (100) takes a cylindrical shape having a side wall (177), bottom opening (178), bottom lip (179), and a top element (180) to enclose or partially enclose the structure. When utilized in this form the recessed housing resembles a cylinder wherein the bottom opening functions as an opening through which the sensor module (102) is inserted and the top element keeps the top portion of the housing enclosed or partially enclosed so the components within the housing are not exposed to other items within the ceiling. The recessed housing (100) element, or "can" as they are sometimes referred to, can be configured for use in a remodel situation or for new construction. Remodel cans are designed for placement within an existing ceiling structure whereas new construction cans are made to be installed when a ceiling is exposed, and components can be anchored to studs as the ceiling is not yet drywalled. The recessed housing described herein can be adapted to function in either a remodel or new construction scenario.

The recessed housing may take forms other than a cylindrical one if such is desired. In a square implementation, for example, the circular side wall would instead comprise four side walls of equal size thereby forming a square shape. Shapes of just about any geometry are feasible if desired as a design feature.

The function of recessed housing (100) is to hold the components of the sensor module (102) within the ceiling where they are out of view. This functionality can be achieved with other housing configurations and shapes not set depicted in detail herein. For example, a square box like structure or other such shaped housing would achieve the same functionality and fall squarely within the scope of the invention described here. A circular configuration to the recessed housing is desirable when the element that protrudes from or is flush with the ceiling is also circular.

The sensor module (102) is configured to fit within the recessed housing (100). Multiple sensor types, such as smoke, carbon monoxide ("CO"), humidity, temperature, particulate, and/or air quality sensors may be integrated into the sensor module (102) either alone or in combination. A device may utilize one or many different sensor types depending upon the desired functionality thereby providing the flexibility needed to address different detection requirements. To enable the sensing functionality the sensor module (102) contains a power supply as well as a battery backup component (106) to enable continuous operation without power. Power is utilized to operate the electronic components within the sensor module (102) which in one or more embodiments of the invention are a high-voltage PCB (108), sound emitting device (110) such as a horn, and a low voltage PCB (112). A sensor element (114) utilizes the components within the sensor module (102) to detect the presence of the aspect or aspects of the environment that is to be detected. The sensor element contains sensors (116). When a detection event occurs, the sound emitting device is triggered and an alarm sounds thereby alerting people nearby of the detection event. The sensor element (114) is positioned flush with or protruding slightly out of the ceiling level if such is needed to optimize the effectiveness of the sensors.

The sensor module enclosure contains a smoke chamber within which smoke accumulates if smoke is present in the environment. Fins are typically placed within the sensor module to guide smoke into the chamber for detection. Sensors other than smoke may also be placed within the sensor module to permit the detection of other elements in the environment.

The finish trim (116) typically resides below the sensor component (102) and is visible in a manner that is flush with the ceiling or thinly protruding below the ceiling thereby reducing the unattractive appearance of the ceiling component. The finish trim (116) is changeable and may utilize various designs. Because the finish trim is removable the device enables installers to change the trim as desired during the installation process or afterwards. The finish trim may, for example, be changed from round to square shapes or any other desirable shape and may incorporate a selection of custom finishes or ornamental design elements. This feature ensures that the smoke detector can be seamlessly incorporated into diverse interior design styles, enhancing aesthetic integration for the environment.

Figure 2:
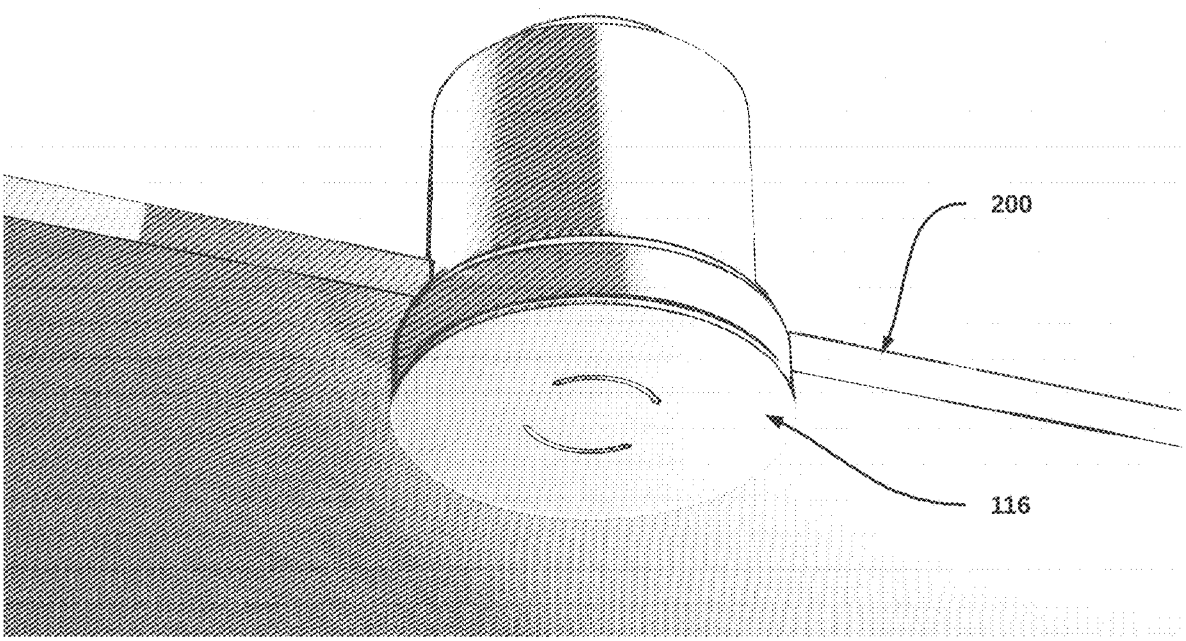
FIG. 2 illustrates a view of the finish trim as configured in accordance with one or more embodiments of the invention.

FIG. 2 illustrates an exemplary view of a finish trim coupled with the recessed housing as configured in accordance with one or more embodiments of the invention. The finish trim (116) couples with the recessed housing (100) which extends into the ceiling (200) in a way where the finish trim protrudes only slightly from the ceiling thereby creating a low-profile ceiling component or smoke detector unit. For example, the finish trim (116) may protrude a quarter inch or half inch from the ceiling providing an improved appearance over prior art smoke detector units which typically protrude further out of the ceiling because the components are not recessed into the ceiling. The finish trim (116) may also be coupled with the recessed housing in a way that enables the trim to become flush with or mostly flush with the ceiling (200).

Figure 3:
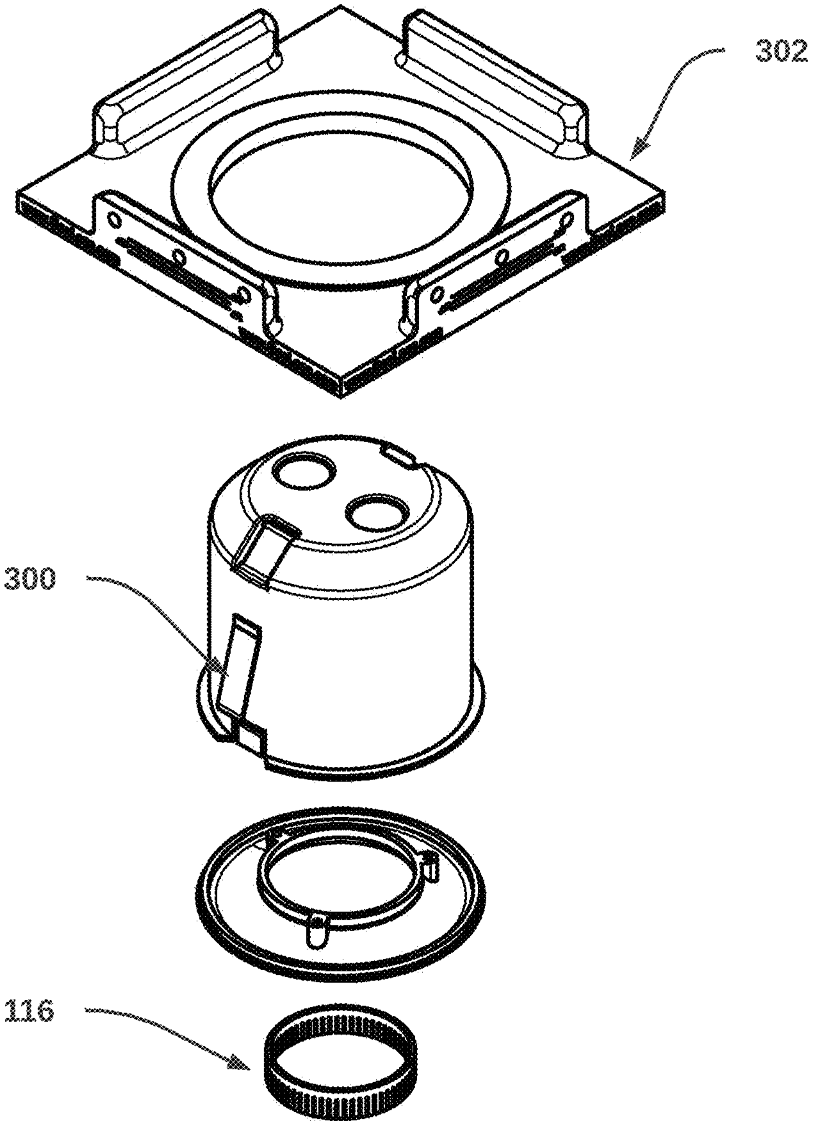
FIG. 3 illustrates a remodel attachment point on the recessed mounting system as it is configured in accordance with one or more embodiments of the invention.

FIG. 3 illustrates a remodel attachment point on the recessed mounting system as it is configured in accordance with one or more embodiments of the invention. In this embodiment ceiling clips (300) extend from the side wall of the recessed housing to enable the device to be held securely in the ceiling. These ceiling clips enable the device to be held above the ceiling. Alternatively, a ceiling cut in element (302) may be installed in the ceiling itself and cut in so that the ceiling clips clip into the ceiling cut in element (302). The device may be installed directly into the ceiling or installed using the ceiling cut in element (302).

Figure 4:
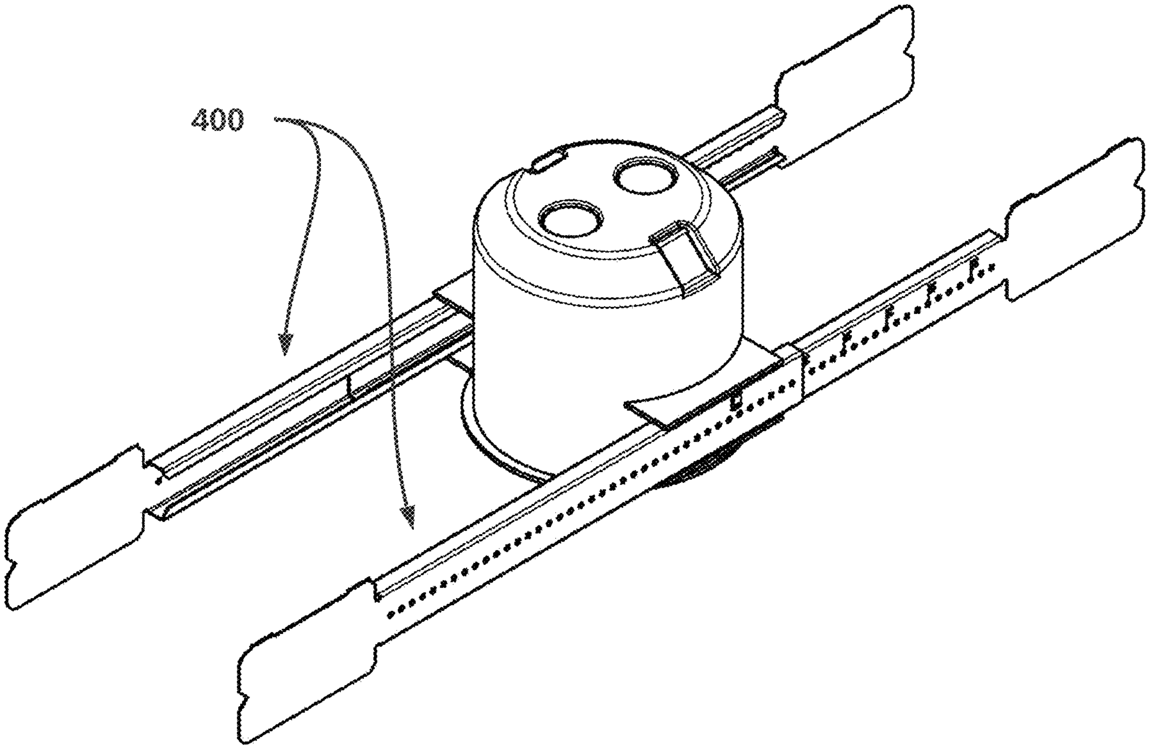
FIG. 4 illustrates a new construction attachment point on the recessed mounting system as it is configured in accordance with one or more embodiments of the invention.

FIG. 4 illustrates a new construction attachment point on the recessed mounting system as it is configured in accordance with one or more embodiments of the invention. When a new construction configuration is desired, the recessed housing utilizes a set of brackets (400) that extend from the recessed housing to enable the device to be attached to ceiling studs prior to the installation of ceiling drywall.

The recessed mounting system offers numerous advantages over traditional ceiling components or smoke detector installations. By recessing the electronics and exposing only the sensing element, the system achieves a streamlined appearance that seamlessly integrates with architectural designs. The modular components of the system enable versatility, adaptability to different sensor types, and customization options for shape and finishes. The system finds applications in residential, commercial, and industrial settings, contributing to safer environments with improved aesthetics.

The recessed mounting system for smoke detectors described herein offers an innovative solution to enhance aesthetic integration, functionality, and ease of installation. By recessing the electronics into the ceiling and exposing only the sensing element, the system achieves a streamlined appearance while maintaining efficient smoke detection capabilities. The combination of the recessed housing, sensor module, and finish trim components provides versatility, adaptability, and customization options, making this system suitable for diverse applications. One or more embodiments of the invention represents a significant advancement in the field of smoke detector mounting and contributes to creating safer and more visually appealing spaces.

Thus, an apparatus for recessing ceiling components such as a smoke detector or other sensing devices into ceiling drywall has been described. The reader should note however that the claims set forth below and the full scope of their equivalents are what define the scope of the invention.

What is claimed is:

1. An apparatus for recessing ceiling components into ceiling drywall comprising:

a recessed housing component containing a sensor module, said recessed housing being configured for installation into ceiling drywall substantially above said ceiling drywall, wherein said sensor module is configured to have multiple integrated sensors, wherein said integrated sensors further comprise:

at least one smoke sensor;

at least one carbon monoxide ("CO") sensor;

at least one humidity sensor;

at least one temperature sensor;

at least one particulate sensor; and at least one air quality sensor;

said sensor module within said recessed housing having sensor electronics coupled with at least one sensor configured to determine if there is smoke within a smoke chamber and upon detection of said smoke causing a sound emitting element to initiate an audible sound;

a sensor module enclosure containing said at least one sensor within said smoke chamber wherein said sensor module enclosure extends out of said recessed housing into a finish trim; and a finish trim element that couples with said recessed housing to cover said sensor enclosure;

wherein said recessed housing is configured in a cylindrical tube shape having a circular side wall, a top end cap, and an open end which extends through said ceiling drywall; and wherein said recessed housing does not extend below said ceiling and said finish trim is flush with said ceiling.

2. The apparatus of claim 1, wherein said recessed housing is configured in a square shape having four side walls, a top end cap, and an open end which extends through said ceiling drywall.

3. The apparatus of claim 1 wherein said recessed housing contains ceiling anchor elements configured to secure said recessed housing into said drywall.

4. The apparatus of claim 1 wherein said recessed housing contains ceiling anchor elements configured to secure said recessed housing into onto ceiling studs above said ceiling drywall.

5. The apparatus of claim 1 wherein said sensor electronics comprises an alternating current ("AC") printed circuit board configured to interface with one or more hardwired electrical wires for supply of power.

6. The apparatus of claim 5 wherein said sensor electronics comprises a direct current ("DC") printed circuit board configured to power low voltage components within said sensor module.

7. The apparatus of claim 6 wherein said alternating current AC printed circuit board and said direct current DC printed circuit board are combined into one unit.

8. The apparatus of claim 1 wherein said sensor module enclosure contains said smoke chamber within which said smoke accumulates if said smoke is present in the environment.

9. The apparatus of claim 1 further comprising a battery backup component for providing power when needed.

* * * * *